Feb. 17, 1942.  C. H. WEICKER  2,273,239
POCKET BILLIARD BALL TRIANGLE
Filed Aug. 24, 1940
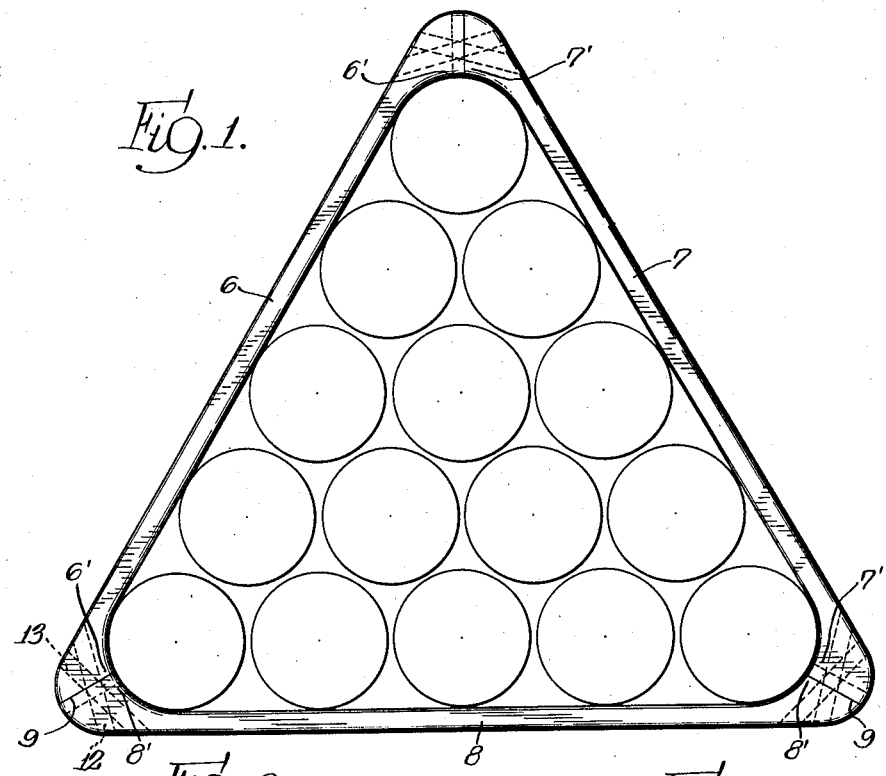
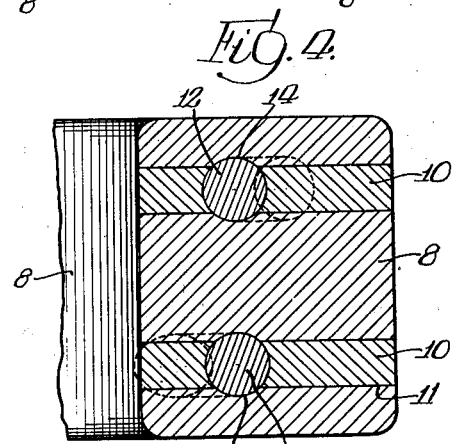
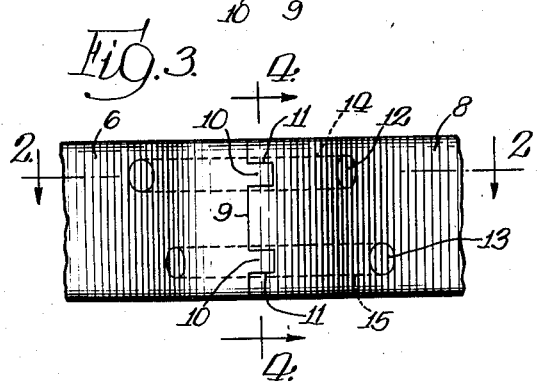
INVENTOR.
Carl H. Weicker,
BY Patented Feb. 17, 1942

2,273,239

UNITED STATES PATENT OFFICE 2,273,239

POCKET BILLIARD BALL TRIANGLE

Carl H. Weicker, Toronto, Ontario, Canada, assignor to The Brunswick-Balke-Collender Company, Chicago, Ill., a corporation of Delaware Application August 24, 1940, Serial No. 354,010
In Canada July 24, 1940

5 Claims. (Cl. 273—22)

This invention relates particularly to a triangle of the type used for arranging pocket-billiard balls on a pocket-billiard table, it being the general object of the invention to provide a new and improved device of this character.

Another object is to provide a triangle having glued corner joints with a new and improved means for reinforcing the joints.

Another object is to provide such a triangle with glued corner joints and locking means therefor arranged to prevent separation of the parts at the joint even though the glue may give.

Another object is to provide such a triangle with corner locking means in the form of dowel pins positioned in crossed bores.

Further objects will become readily apparent from the following detailed description taken in connection with the accompanying drawing, wherein:

Figure 1 is a plan view of a preferred form of the invention shown with a set of pocket-billiard balls arranged therein;

Figure 2 is a fragmentary section along the line 2—2 of Figure 3;

Figure 3 is a fragmentary view looking at one corner of the triangle or upwardly at Figure 2; and Figure 4 is a section along the line 4—4 of Figure 3.

Although there is shown in the drawing and shall herein be described in detail a preferred form of the invention, it is to be understood that the invention is not limited to the particular arrangement shown, it being contemplated that various changes may be made by those skilled in the art without departing from the spirit and scope of the appended claims.

As illustrated in the drawing, the preferred form of my invention comprises three side members, 6, 7 and 8, generally in the form of flat strips of wood enlarged at their ends as at 6', 7' and 8', and arranged in triangular form. Preferably, the ends of the members 6, 7 and 8 are cut on a 60° angle so that they may be placed together at the corners and glued to form glued joints 9.

As illustrated herein, means is provided for locking the members together at the corners so that they cannot be pulled apart even though the glued joints may break. Thus the adjacent angular surface on one end of each member is provided with a pair of ribs 10 and the corresponding surface of the adjacent member is provided with grooves 11 arranged to receive the ribs 10. It will be readily apparent as viewed in Figure 3 that this will effectively prevent upward movement of one member relative to the other even though the glued joint therebetween may break.

Means is also provided for preventing separation of the adjacent ends of two members in a direction perpendicular to the glued joint 9. In the form illustrated this means comprises a pair of dowel pins 12 and 13 which are inserted and glued into bores 14 and 15 extending through the enlarged portions of the side members in a crossed or intersecting manner as indicated in Figures 1 and 2. It is believed readily apparent that, by inserting these dowel pins into the bores 14 and 15 after the side members of the triangle have been assembled and their corners glued together, it is not possible to pull the members apart at the corners due to the locking or wedging action of the dowel pins, even though the glued joint may break.

I claim as my invention:

1. A pocket-billiard ball arranging triangle comprising three side members having angular end surfaces glued together to form joints therebetween, means on one end of each of said members formed to inter-fit with means on the adjacent end of the adjoining member to prevent movement of the members relatively to each other in a direction parallel to the joint, and means at each joint for preventing separation of the members comprising a pair of dowel pins positioned in bores extending through the corners of the triangle at different acute angles to the glued joint.

2. A pocket-billiard ball arranging triangle comprising three side members having enlarged integral end portions with angular end surfaces placed together to form joints therebetween, means on one end of each of said members fitted to inter-engage snugly with means on the adjacent end of the adjoining member to prevent movement of the members relatively to each other in a direction parallel to said joints, and means for preventing separation of the members at each corner of the triangle comprising a pair of dowel pins positioned respectively in bores extending with their axes oppositely oblique to the plane of the joint and spaced apart in planes substantially parallel to the face of the triangle.

3. A pocket-billiard ball arranging triangle comprising three side members having integral end portions with angular end surfaces placed together to form joints therebetween and means for preventing separation of the members at each corner of the triangle comprising a pair of dowel pins positioned respectively in bores extending with their axes oppositely oblique to the plane of the joint and spaced apart in planes substantially parallel to the face of the triangle.

4. A pocket-billiard ball arranging triangle comprising side members provided with integral angularly shaped ends arranged to abut when the members are assembled, a rib on the end of one member arranged to fit in a groove on the adjacent end of an adjoining member to prevent movement of said members relatively to each other in a direction parallel to the joint, and means which lock said members together at each corner of the triangle to prevent separation thereof in a direction perpendicular to the joint comprising a pair of dowel pins positioned respectively in bores extending with their axes oppositely oblique to the plane of the joint and in planes spaced apart between the faces of the triangle.

5. A pocket-billiard ball arranging triangle comprising side members provided with enlarged integral end portions having angularly end shaped surfaces which abut when the members are assembled, one of the abutting surfaces at each corner of the triangle having a pair of ribs extending parallel to the face of the triangle and the adjacent end of the adjoining member having a pair of grooves into which said ribs fit snugly when the members are assembled to prevent movement of said members relatively to each other in a direction parallel to the joint, and means which lock said members together at the corners to prevent separation thereof comprising a pair of dowel pins at each corner positioned respectively in bores extending with their axes oppositely oblique to the plane of the joint and spaced apart in planes substantially parallel to the faces of the triangle.

CARL H. WEICKER.